United States Patent
Akaho

(10) Patent No.: US 9,231,426 B2
(45) Date of Patent: Jan. 5, 2016

(54) CHARGE CONTROL DEVICE AND ELECTRONIC APPARATUS USING THE SAME

(71) Applicant: Rohm Co., Ltd., Kyoto (JP)

(72) Inventor: Tadashi Akaho, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 198 days.

(21) Appl. No.: 13/956,481

(22) Filed: Aug. 1, 2013

(65) Prior Publication Data
US 2014/0035533 A1 Feb. 6, 2014

(30) Foreign Application Priority Data
Aug. 1, 2012 (JP) .................................. 2012-170961

(51) Int. Cl.
H02J 7/00 (2006.01)
(52) U.S. Cl.
CPC *H02J 7/007* (2013.01); *H02J 7/009* (2013.01)
(58) Field of Classification Search
CPC ............ H02J 7/007; H02J 7/009; H02J 7/025
USPC .................. 320/108, 132, 134, 135, 136, 137
See application file for complete search history.

(56) References Cited

U.S. PATENT DOCUMENTS

| | | | | |
|---|---|---|---|---|
| 6,794,852 B2 * | 9/2004 | Tran | ............................. | 320/132 |
| 2003/0008202 A1 * | 1/2003 | Tran | ............................. | 429/61 |
| 2013/0043833 A1 * | 2/2013 | Katz et al. | ..................... | 320/108 |

FOREIGN PATENT DOCUMENTS

| | | |
|---|---|---|
| JP | 2002-152988 | 5/2002 |
| JP | 2011-203235 | 10/2011 |

* cited by examiner

*Primary Examiner* — Vuthe Siek
(74) *Attorney, Agent, or Firm* — Fish & Richardson P.C.

(57) ABSTRACT

A charge control device includes a control circuit configured to monitor a charge voltage and a charge current of a battery and perform output feedback control upon the charge voltage and the charge current to thereby achieve constant voltage charge or constant current charge of the battery; and an adjusting circuit configured to adjust the output feedback control of the control circuit based on charge state information of the battery obtained by a gas gauge device.

19 Claims, 8 Drawing Sheets

CHARGE CONTROL DEVICE AND ELECTRONIC APPARATUS USING THE SAME

CROSS-REFERENCE TO RELATED APPLICATION

This application is based upon and claims the benefit of priority from Japanese Patent Application No. 2012-170961, filed on Aug. 1, 2012, the entire contents of which is incorporated herein by reference.

TECHNICAL FIELD

The present disclosure relates to a charge control device and an electronic apparatus using the same.

BACKGROUND

Charge accuracy (generally, about ±1.0%) of a battery has been determined by the performance of a charge control device (for example, a charge control IC or a system IC having charge control function) only.

However, it is difficult to completely eliminate manufacture variations (variation of temperature characteristics, variation of package stress, variation of implementation stress, etc.) of the charge control device. Therefore, there is a limit to enhance the charge accuracy of the battery by the charge control device only.

SUMMARY

The present disclosure provides some embodiments of a charge control device having high control accuracy.

According to one embodiment of the present disclosure, provided is a charge control device, including: a control circuit configured to monitor a charge voltage and a charge current of a battery and perform output feedback control upon the charge voltage and the charge current to thereby achieve constant voltage charge or constant current charge of the battery; and an adjusting circuit configured to adjust the output feedback control of the control circuit based on charge state information of the battery obtained by a gas gauge device.

In some embodiments, the control circuit is configured to perform the output feedback control of the charge voltage to maintain the charge voltage at a target voltage when the constant voltage charge of the battery is required, and perform the output feedback control of the charge current to maintain the charge current at a target current when the constant current charge of the battery is required, and the adjusting circuit is configured to adjust the target voltage and the target current based on the charge state information.

In some embodiments, the control circuit is configured to perform the constant voltage charge of the battery until the charge voltage reaches the target voltage, and perform the constant voltage charge of the battery after the charge voltage reaches the target voltage.

In some embodiments, the adjusting circuit is configured to through-output the target voltage and the target current without adjusting the target voltage and the target current when the charge state information is not input.

In some embodiments, the adjusting circuit is configured to adjust the target voltage and the target current based on difference between an actual charge voltage and an actual charge current indicated by the charge state information and the target voltage and the target current.

In some embodiments, the charge control device further includes a protection circuit configured to forcibly stop the charge of the battery when the difference exceeds a predetermined threshold.

In some embodiments, the charge control device further includes an interface circuit configured to transmit and receive digital signals to and from an external bus.

In some embodiments, the target voltage, the target current and the charge state information are inputted to the interface circuit as digital signals.

In some embodiments, the adjusting circuit includes resistors configured to store the target voltage, the target current and the charge state information as digital signals.

In some embodiments, the control circuit includes digital/analog converters configured to convert the target voltage and the target current inputted as digital signals from the adjusting circuit into analog signals.

According to another embodiment of the present disclosure, provided is an electronic apparatus, including: the above-described charge control device; a battery controlled by the charge control device; a gas gauge device configured to obtain charge state information of the battery; and a host device configured to perform overall control of the charge control device and the gas gauge device.

In some embodiments, the electronic apparatus includes a cellular phone, a portable information terminal, a digital still camera or a digital video camera.

DETAILED DESCRIPTION

Overall Construction

Figure 1:
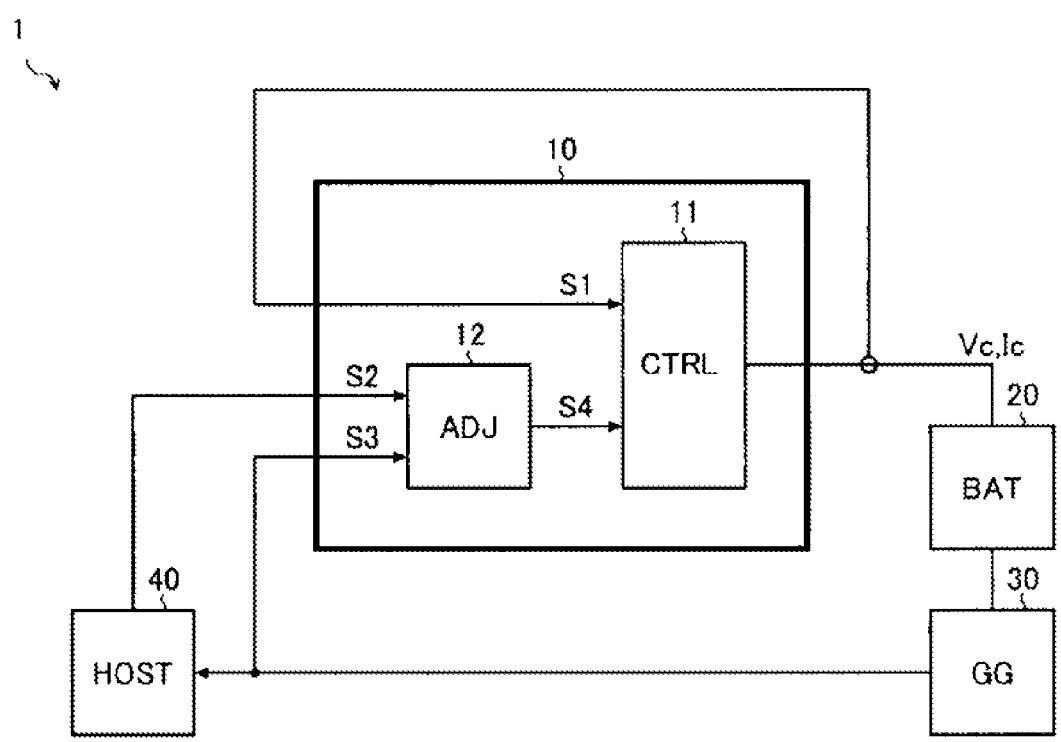
FIG. 1 is a block diagram showing an example of an electronic apparatus including a charge control device according to an embodiment of the present disclosure.

FIG. 1 is a block diagram showing an example of an electronic apparatus 1 including a charge control device 10 according to an embodiment of the present disclosure. The electronic apparatus 1 of the example includes the charge control device 10, a battery 20, a gas gauge device 30 and a host device 40.

The charge control device 10 may be a monolithic semiconductor integrated circuit device (i.e., charge control IC) that performs charge control of the battery 20. The charge control device 10 includes a control circuit 11 and an adjusting circuit 12.

Figure 2:
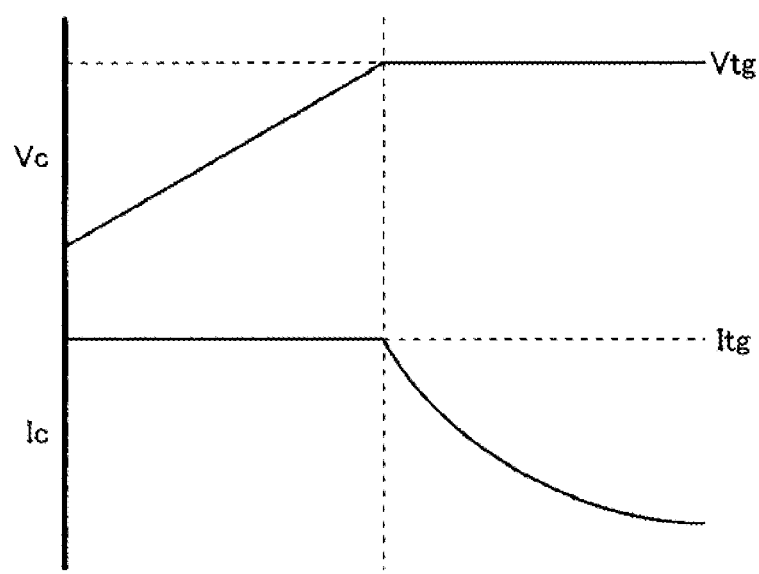
FIG. 2 is a view showing an example of charge control operation of the charge control device.

The control circuit 11 monitors output value information S1 (including output voltage value information S1V corresponding to a charge voltage Vc and output current value information S1I corresponding to a charge current Ic) of the battery 20 and performs output feedback control based on adjusted target value information S4 (including adjusted target voltage value information S4V and adjusted target current value information S4I) provided by the adjusting circuit 12 to thereby perform constant voltage charge or constant current charge. For example, the control circuit 11 performs the constant current charge of the battery 20 by maintaining the charge current Ic at a target current Itg until the charge voltage Vc reaches a target voltage Vtg and performs the constant voltage charge of the battery 20 by maintaining the charge voltage Vc at the target voltage Vtg after the current voltage Vc reaches the target voltage Vtg (see FIG. 2).

The adjusting circuit 12 adjusts target value information S2 (including target voltage value information S2V corresponding to the target voltage Vtg and target current value information S2I corresponding to the target current Itg) input from the host device 40 based on a charge state information S3 (including charge voltage state information S3V corresponding to an actual charge voltage Vc and charge current state information S3I corresponding to an actual charge current Ic) obtained from the gas gauge device 30 to thereby generate the adjusted target value information S4. Afterwards, the adjusting circuit 12 transmits the adjusted target value information S4 to the control circuit 11.

The battery 20 is used as a power source of the electronic apparatus 1. The battery 20 may be a secondary battery (lithium ion battery, nickel hydrogen battery, etc.). The charge operation of the battery 20 is controlled by the charge control device 10.

The gas gauge device 30 may be a monolithic semiconductor integrated circuit device (i.e., a gas gauge IC or a fuel gauge IC), which constantly monitors the charge voltage Vc and the charge current Ic of the battery 20 to acquire the charge state information S3 of the battery 20. Also, the gas gauge device 30 may be a custom IC, which is provided for detecting the charge state information S3 of the battery 20. The gas gauge device 30 generally has higher detection accuracy (±0.2% or so) than charge accuracy (±1.0% or so) of the charge control device 10.

The host device 40 controls overall operation of the electronic apparatus 1 including operation of the charge control device 10, the gas gauge device 30 and the like. For example, the host device 40 supplies the target value information S2 to the charge control device 10 or controls a display device (not shown) in order to display a charge state of the battery 20 based on the charge state information S3 acquired from the gas gauge device 30. A central processing unit (CPU) and the like may be used as the host device 40.

As described above, in the electronic apparatus 1 of the example, the charge control device 10 is configured to compensate manufacture variations (variation of temperature characteristics, variation of package stress, variation of implementation stress, etc.) of the charge control device 10 in order to improve the charge accuracy of the battery 20 using the charge state information S3 acquired from the gas gauge device 30.

With this configuration, the variation in full charge capacity and battery life of the battery 20 can be compensated. In general, the variation of the battery life becomes larger when the battery life is longer. Therefore, in the electronic apparatus 1 with a long-life battery 20, it is more desirable to mount the charge control device 10 capable of enhancing the charge accuracy of the battery 20 by using the charge state information S3 acquired from the gas gauge device 30.

First Example of Charge Control Device

Figure 3:
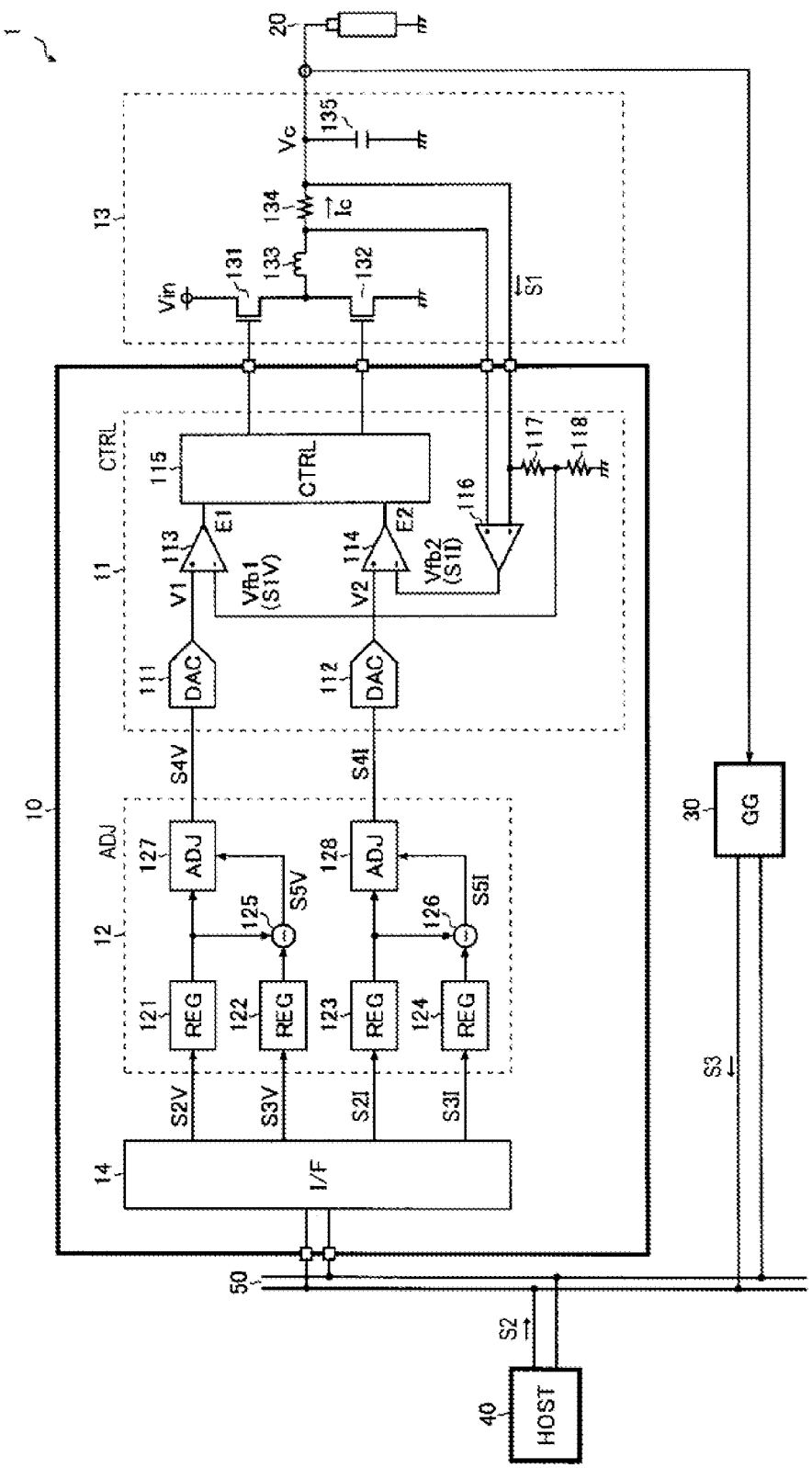
FIG. 3 is a block diagram showing a first example of the charge control device.

FIG. 3 is a block diagram showing a first example of the charge control device 10. The charge control device 10 of the first example includes the control circuit 11, the adjusting circuit 12, an output circuit 13 and an interface circuit 14.

The control circuit 11 includes digital/analog converters 111 and 112 (hereinafter, referred to as DAC (digital/analog converter) 111 and DAC 112), error amplifiers 113 and 114, a switch control unit 115, an amplifier 116, and resistors 117 and 118.

The DAC 111 converts the adjusted target voltage value information S4V input as a digital signal from the adjusting circuit 12 into a reference voltage V1 of an analog signal.

The DAC 112 converts the adjusted target current value information S4I input as a digital signal from the adjusting circuit 12 into a reference voltage V2 of an analog signal.

The error amplifier 113 generates an error signal E1 corresponding to a difference between the reference voltage V1 (corresponding to the adjusted target voltage value information S4V) applied to a non-inverting input terminal (+) and a feedback voltage Vfb1 (corresponding to the output voltage value information S1V (charge voltage Vc)) applied to an inverting input terminal (−). The error amplifier 113 outputs the error signal E1 to the switch control unit 115.

The error amplifier 114 generates an error signal E2 corresponding to a difference between the reference voltage V2 (corresponding to the adjusted target current value information S4I) applied to a non-inverting input terminal (+) and a feedback voltage Vfb2 (corresponding to the output current value information S1I (charge current Ic)) applied to an inverting input terminal (−). The error amplifier 114 outputs the error signal E2 to the switch control unit 115.

The switch control unit 115 performs on/off control of switch elements 131 and 132 included in the output circuit 13, based on the error signals E1 and E2. More particularly, the switch control unit 115 performs output feedback control of the charge voltage Vc so that the error signal E1 is reduced when the constant voltage charge of the battery 20 is required. Meanwhile, the switch control unit 115 performs output feedback control of the charge current Ic so that the error signal E2 is reduced when the constant current charge of the battery 20 is required.

In other words, the switch control unit 115 performs the output feedback control of the charge voltage Vc by maintaining the feedback voltage Vfb1 (corresponding to the charge voltage Vc) at the reference voltage V1 (corresponding to the target voltage Vtg) during the constant voltage charge of the battery 20. Meanwhile, the switch control unit 115 performs the output feedback control of the charge current Ic by maintaining the feedback voltage Vfb2 (corresponding to the charge current Ic) at the reference voltage V2 (corresponding to the target current Itg) during the constant current charge of the battery 20.

The amplifier 116 amplifies a voltage (corresponding to the charge current Ic of the battery 20) across a sense resistor 134 included in the output circuit 13 to thereby generate the feedback voltage Vfb2.

The resistors 117 and 118 divide the charge voltage Vc of the battery 20 to generate the feedback voltage Vfb1.

The adjusting circuit 12 includes registers 121 to 124, subtractors 125 and 126, and adjusting units 127 and 128.

The register 121 stores the target voltage value information S2V (corresponding to the target voltage Vtg) input as a digital signal from the interface circuit 14.

The register 122 stores the charge voltage state information S3V (corresponding to the actual charge voltage Vc) input as a digital signal from the interface circuit 14.

The register 123 stores the target current value information S2I (corresponding to the target current Itg) input as a digital signal from the interface circuit 14.

The register 124 stores the charge current state information S3I (corresponding to the actual charge current Ic) input as a digital signal from the interface circuit 14.

The subtractor 125 subtracts the value of the charge voltage state information S3V from the value of the target voltage value information S2V to thereby obtain the value of differential voltage value information S5V (corresponding to a differential voltage value between the target voltage Vtg and the charge voltage Vc). The value of the differential voltage value information S5V is a negative value when the charge voltage Vc is higher than the target voltage Vtg, and is a positive value when the charge voltage Vc is lower than the target voltage Vtg.

The subtractor 126 subtracts the value of the charge current state information S3I from the value of the target current value information S2I to thereby obtain the value of the differential current value information S5I (corresponding to differential current value between the target current Itg and the charge current Ic). The value of the differential current value information S5I is a negative value when the charge current Ic is higher than the target current Itg and is a positive value when the charge current Ic is lower than the target current Itg.

The adjusting unit 127 adjusts the target voltage value information S2V based on the differential voltage value information S5V to thereby generate the adjusted target voltage value information S4V. The adjusting unit 127 outputs the adjusted target voltage value information S4V to the DAC 111. The adjusting unit 127 adjusts the target voltage value information S2V to decrease the target voltage Vtg when the value from the differential voltage value information S5V is a negative value. On the other hand, the adjusting unit 127 adjusts the target voltage value information S2V to increase the target voltage Vtg when the value from the differential voltage value information S5V is a positive value.

The adjusting unit 128 adjusts the target current value information S2I based on the differential current value information S5I to thereby generate the adjusted target current value information S4I. The adjusting unit 128 outputs the adjusted target current value information S4I to the DAC 112. The adjusting unit 128 adjusts the target current value information S2I to decrease the target current Itg when the value from the differential current value information S5I is a negative value. On the other hand, the adjusting unit 128 adjusts the target current value information S2I to increase the target current Itg when the value from the differential current value information S5I is a positive value.

Also, the adjusting circuit 12 may be configured to through-output the target value information S2 (i.e., the target voltage value information S2V and the target current value information S2I) without adjusting the target value information S2 when the charge state information S3 (i.e., the charge voltage state information S3V and the charge current state information S3I) is not input. With this configuration, when the gas gauge device 30 is not provided in the electronic apparatus 1, it is possible to perform the output feedback control of the charge voltage Vc and the charge current Ic, as described above, by using the charge control device 10 alone without requiring an additional switching control device.

Further, as a method for realizing the above configuration, the adjusting circuit 12 may be configured to store the target value information S2 in the registers 122 and 124 as well as in the registers 121 and 123 in parallel. With this configuration, it is possible to substantially stop the adjusting operation for the target value information S2 by the adjusting units 127 and 128 because the differential value information S5 (i.e., the differential voltage value information S5V and the differential current value information S5I) acquired from the subtractors 125 and 126 is zero, unless the contents of the registers 122 and 124 are rewritten by the charge state information S3.

The output circuit 13 may be a discrete circuit mounted on the charge control device 10. The output circuit 13 includes switch elements (N-channel metal oxide semiconductor (MOS) field effect transistor) 131 and 132, a coil 133, the sense resistor 134 and a capacitor 135.

A first terminal (drain) of the switch element 131 is connected to an input terminal of an input voltage Vin. A second terminal (source) of the switch element 131 and a first terminal (drain) of the switch element 132 are connected to a first terminal of the coil 133. In addition, a second terminal (source) of the switch element 132 is connected to a ground terminal Control terminals (gates) of the switch elements 131 and 132 are connected to the switch control unit 115. A second terminal of the coil 133 is connected to a first terminal of the sense resistor 134 and a non-inverting input terminal (+) of the amplifier 116. A second terminal of the sense resistor 134 is connected to a positive electrode terminal of the battery 20 and an inverting input terminal (−) of the amplifier 116. The capacitor 135 is connected between the positive electrode terminal and the ground terminal of the battery 20.

The output circuit 13 configured as above steps down the input voltage Vin to generate the charge voltage Vc by complementary (exclusive) on/off control of the switch elements 131 and 132. However, it should be noted that the circuit configuration of the output circuit 13 is not limited thereto, and other circuit configuration may be adopted.

The interface circuit 14 may be a front-end circuit, which transmits and receives the digital signals to and from the host device 40 or the gas gauge device 30 via an external bus 50. The target value information S2 and the charge state information S3 as described above are input to the interface circuit 14 in the form of digital signals. Also, an I2C bus may be used as the external bus 50.

The gas gauge device 30 outputs the charge state information S3 to the external bus 50 in response to a request signal transmitted from the host device 40 in a predetermined interval. Thus, the interface circuit 14 is configured to acquire the charge state information S3 regularly transmitted toward the host device 40 from the gas gauge device 30, and the contents of the registers 122 and 124 are updated based on the acquired charge state information S3.

With the configuration of the charge control device 10 of the first example, it is possible to improve the charge accuracy of the battery 20 by compensating the output feedback control by using the charge state information S3 acquired from the gas gauge device 30.

Second Example of Charge Control Device

Figure 4:
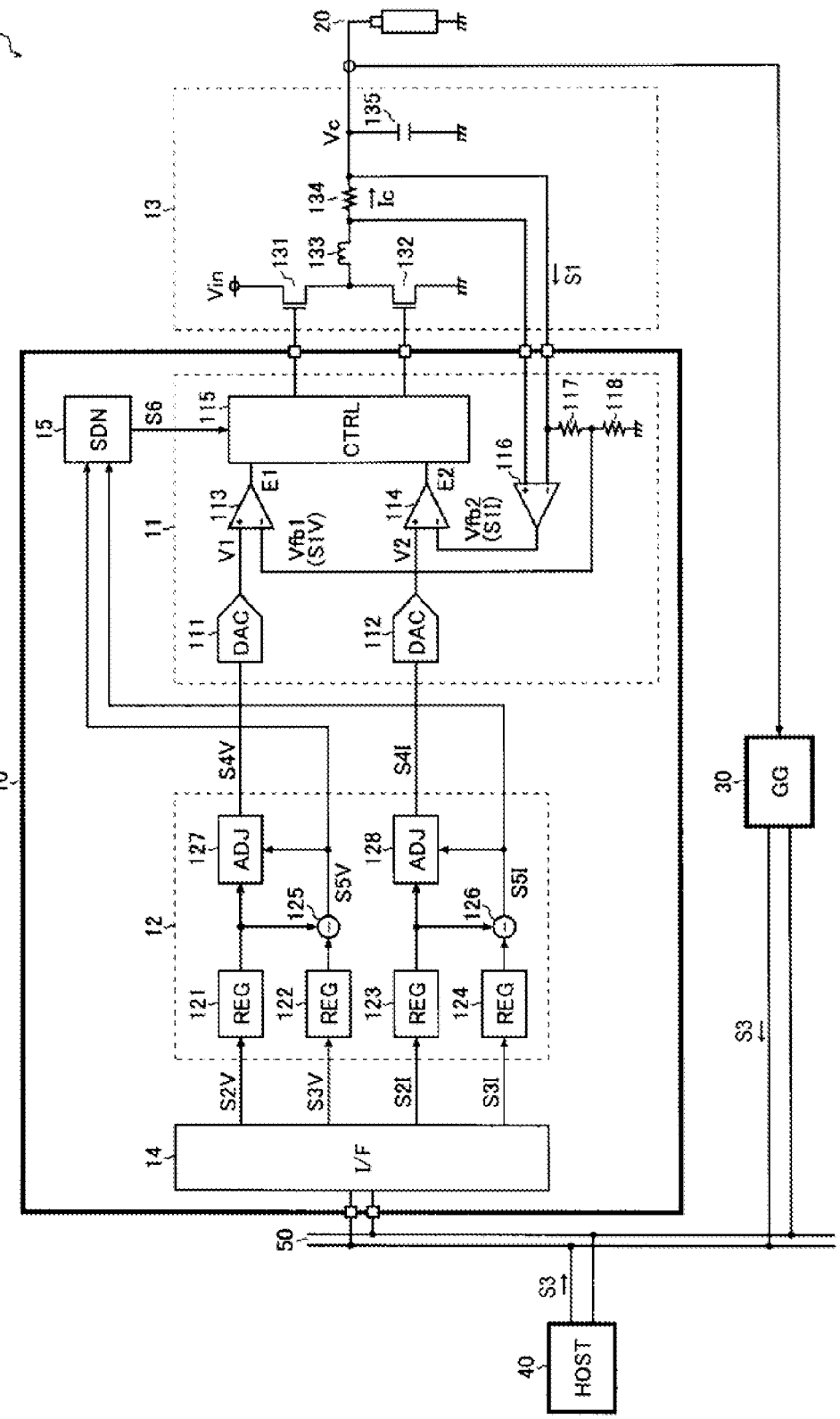
FIG. 4 is a block diagram showing a second example of the charge control device.

FIG. 4 is a block diagram showing a second example of the charge control device 10. The second example is almost identically configured as the first example, except that a protection circuit 15 is added. Therefore, the same elements as in the first example are denoted by the same reference numerals as in FIG. 3 and repetitive descriptions will be omitted. Also, the following description will be focused on characteristic portions particular of the second example.

The protection circuit 15 generates a protection signal S6 for forcibly stopping the charge operation of the battery 20 when the values from the differential value information S5 respectively generated from the subtractors 125 and 126 exceed a predetermined threshold. The protection circuit 15 transmits the protection signal S6 to the switch control unit 115. With this configuration, it is possible to enhance the stability of the electronic apparatus 1 since the charge operation of the battery 20 is forcibly stopped when malfunction occurs in at least one of the charge control device 10 and the gas gauge device 30 when the differential value information S5 becomes larger.

Electronic Apparatus using Charge Control Device

Figure 5:
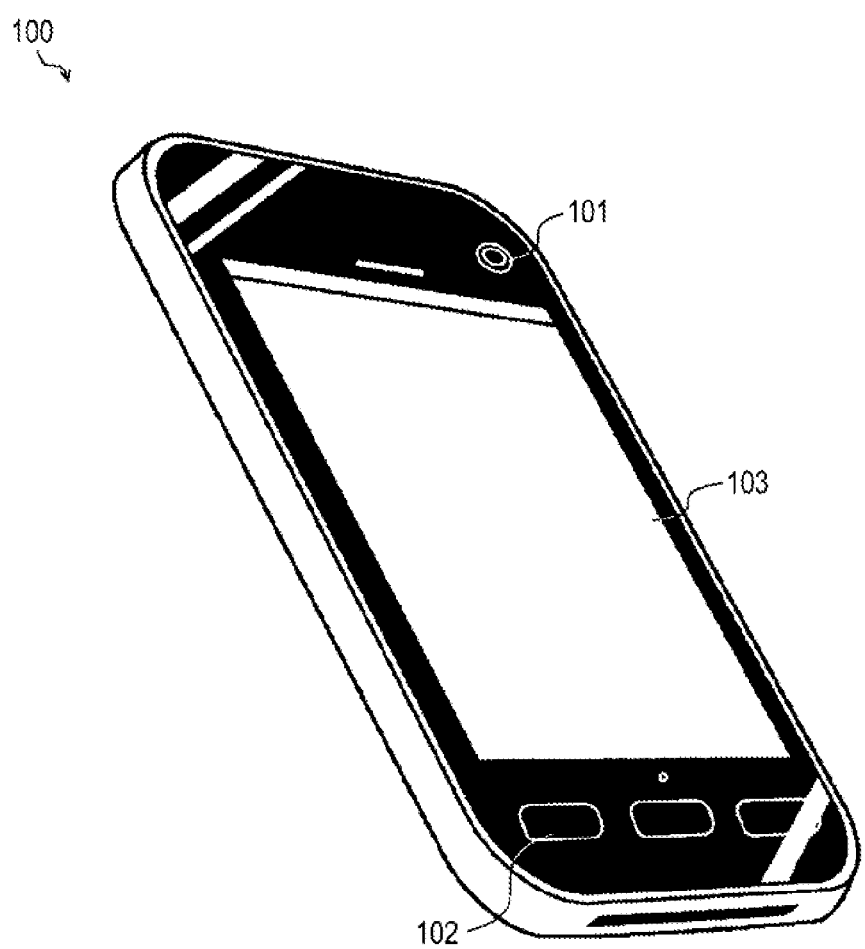
FIG. 5 is an external view of a cellular phone.

FIG. 5 is an external view of a cellular phone 100. The cellular phone 100 is an example of the electronic apparatus 1 which may be a smartphone. The cellular phone 100 includes an imaging unit 101 mounted on a front or back of a body of the cellular phone 100, an operation unit 102 (e.g., various buttons) for receiving a user operation, and a display unit 103 for displaying characters and images. Also, the display unit 103 may be provided with a touch panel function for receiving a touch operation of a user.

Figure 6:
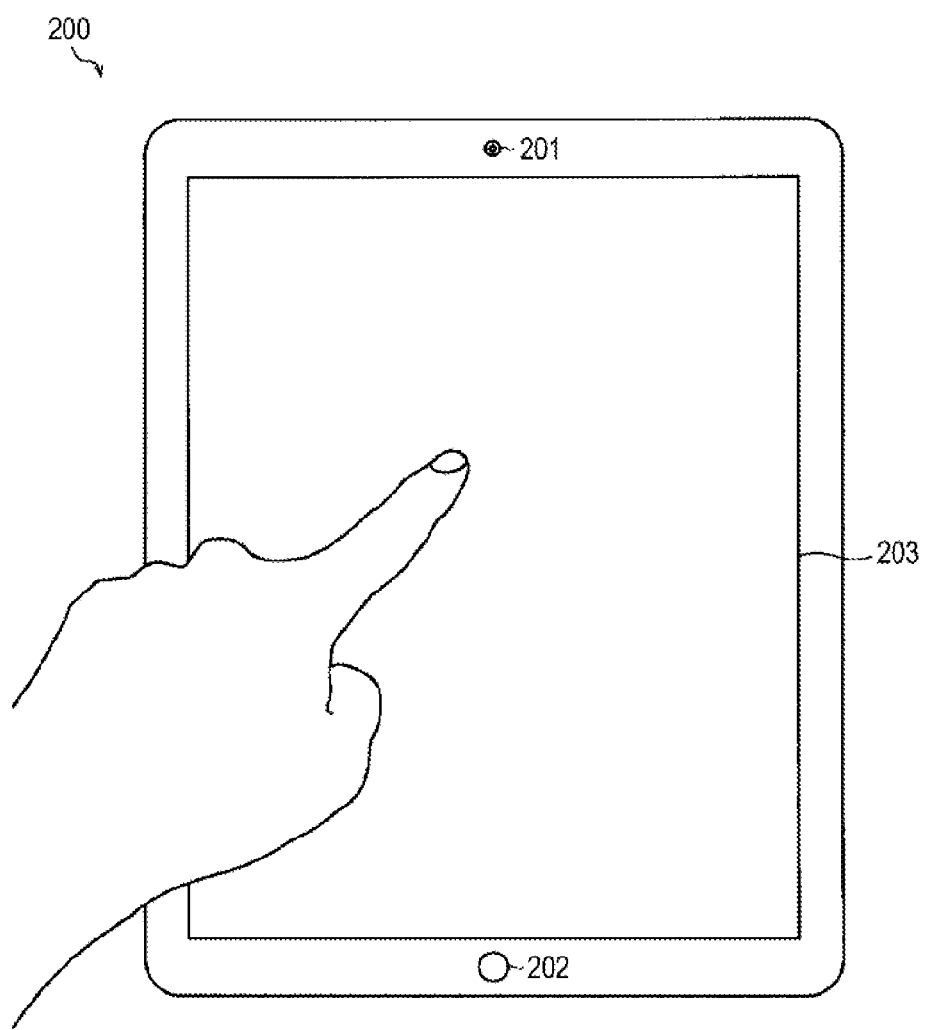
FIG. 6 is an external view of a portable information terminal.

FIG. 6 is an external view of a portable information terminal 200. The portable information terminal 200 is another example of the electronic apparatus 1, which may be a tablet PC. The portable information terminal 200 includes an imaging unit 201 mounted on a front or back side of a body of the portable information terminal 200, an operation unit 202 (such as various buttons) for receiving a user operation, and a display unit 203 for displaying characters and images. Further, the display unit 203 is provided with a touch panel function for receiving a touch operation of a user. The portable information terminal 200, in addition to the tablet PC, may be a notebook PC, a portable game machine and the like.

Figure 7:
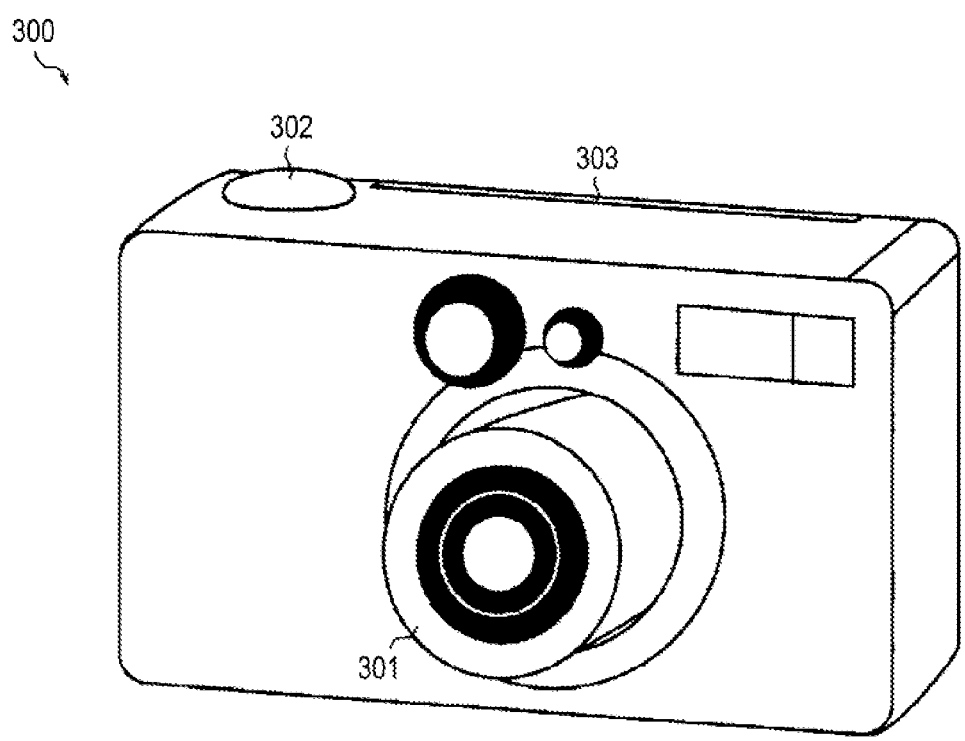
FIG. 7 is an external view of a digital still camera.

FIG. 7 is an external view of a digital still camera 300. The digital still camera 300 is still another example of the electronic apparatus 1. The digital still camera 300 includes an imaging unit 301 for taking a still picture, an operation unit 302 (such as a release button, a zoom lever, etc.) for receiving a user operation, and a display unit 303 for displaying the still picture or a menu screen.

Figure 8:
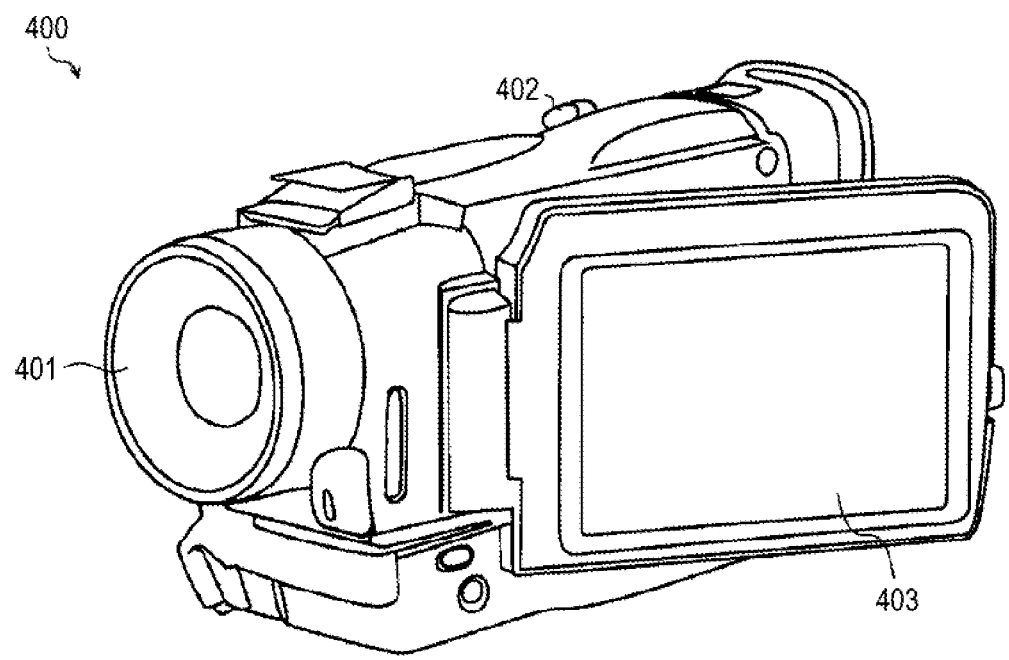
FIG. 8 is an external view of a digital video camera.

FIG. 8 is an external view of a digital video camera 400. The digital video camera 400 is still another example of the electronic apparatus 1. The digital video camera 400 includes an imaging unit 401 for taking moving picture images, an operation unit 402 (such as imaging start/stop button, a zoom lever, etc.), and a display unit 403 for displaying the moving picture images or a menu screen.

It is possible to suppress the variation of the battery life to improve reliability and convenience by installing the charge control device 10 described above in any of the foregoing electronic devices 100, 200, 300 and 400.

Other Modifications

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The present disclosure may be utilized in the electronic apparatus having a rechargeable battery such as the cellular phone (including smart phone), the digital still camera, the digital video camera, the tablet PC, the notebook PC, the portable game machine and the like.

According to the present disclosure, it is possible to provide a charge control device having high charge accuracy and an electronic apparatus using the same.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A charge control device, comprising:
    a control circuit configured to monitor a charge voltage and a charge current of a battery and perform an output feedback control upon the charge voltage and the charge current to thereby achieve a constant voltage charge or a constant current charge of the battery; and
    an adjusting circuit configured to adjust the output feedback control of the control circuit based on charge state information of the battery obtained by a gas gauge device,
    wherein the control circuit is configured to perform the output feedback control of the charge voltage to maintain the charge voltage at a target voltage when the constant voltage charge of the battery is required, and perform the output feedback control of the charge current to maintain the charge current at a target current when the constant current charge of the battery is required, and
    wherein the adjusting circuit is configured to adjust the target voltage and the target current based on the charge state information.

2. The charge control device of claim 1, wherein the control circuit is configured to perform the constant voltage charge of the battery until the charge voltage reaches the target voltage, and perform the constant voltage charge of the battery after the charge voltage reaches the target voltage.

3. The charge control device of claim 1, wherein the adjusting circuit is configured to through-output the target voltage and the target current without adjusting the target voltage and the target current when the charge state information is not input.

4. The charge control device of claim 1, wherein the adjusting circuit is configured to adjust the target voltage and the target current based on difference between an actual charge voltage and an actual charge current indicated by the charge state information and the target voltage and the target current.

5. The charge control device of claim 4, further comprising:
    a protection circuit configured to forcibly stop the charge of the battery when the difference exceeds a predetermined threshold.

6. The charge control device of claim 4, further comprising:
    an interface circuit configured to transmit and receive digital signals to and from an external bus.

7. The charge control device of claim 6, wherein the target voltage, the target current and the charge state information are input to the interface circuit as digital signals.

8. The charge control device of claim 7, wherein the adjusting circuit comprises resistors configured to store the target voltage, the target current and the charge state information as digital signals.

9. The charge control device of claim 7, wherein the control circuit comprises digital/analog converters configured to convert the target voltage and the target current input as digital signals from the adjusting circuit into analog signals.

10. An electronic apparatus, comprising:
   the charge control device of claim 1;
   a battery controlled by the charge control device;
   a gas gauge device configured to obtain charge state information of the battery; and
   a host device configured to perform overall control of the charge control device and the gas gauge device.

11. The electronic apparatus of claim 10, wherein the electronic apparatus comprises a cellular phone, a portable information terminal, a digital still camera or a digital video camera.

12. A charge control device, comprising:
   a control circuit configured to monitor a charge voltage and a charge current of a battery and perform an output feedback control upon the charge voltage and the charge current to thereby achieve a constant voltage charge or a constant current charge of the battery; and
   an adjusting circuit configured to adjust the output feedback control of the control circuit based on charge state information of the battery obtained by a gas gauge device,
   wherein the control circuit is configured to perform the output feedback control of the charge voltage to maintain the charge voltage at a target voltage when the constant voltage charge of the battery is required, and
   wherein the adjusting circuit is configured to adjust the target voltage based on the charge state information.

13. The charge control device of claim 12, wherein the adjusting circuit is configured to through-output the target voltage without adjusting the target voltage when the charge state information is not input.

14. The charge control device of claim 12, wherein the adjusting circuit is configured to adjust the target voltage based on a difference between an actual charge voltage and an actual charge current indicated by the charge state information and the target voltage.

15. The charge control device of claim 14, further comprising:
   a protection circuit configured to forcibly stop the charge of the battery when the difference exceeds a predetermined threshold.

16. A charge control device, comprising:
   a control circuit configured to monitor a charge voltage and a charge current of a battery and perform an output feedback control upon the charge voltage and the charge current to thereby achieve a constant voltage charge or a constant current charge of the battery; and
   an adjusting circuit configured to adjust the output feedback control of the control circuit based on charge state information of the battery obtained by a gas gauge device,
   wherein the control circuit is configured to perform the output feedback control of the charge current to maintain the charge current at a target current when the constant current charge of the battery is required, and
   wherein the adjusting circuit is configured to adjust the target current based on the charge state information.

17. The charge control device of claim 16, wherein the adjusting circuit is configured to through-output the target current without adjusting the target current when the charge state information is not input.

18. The charge control device of claim 16, wherein the adjusting circuit is configured to adjust the target current based on a difference between an actual charge voltage and an actual charge current indicated by the charge state information and the target current.

19. The charge control device of claim 18, further comprising:
   a protection circuit configured to forcibly stop the charge of the battery when the difference exceeds a predetermined threshold.

* * * * *